United States Patent
Aslanis

(10) Patent No.: US 12,495,783 B2
(45) Date of Patent: Dec. 16, 2025

(54) TRAP FOR INSECTS

(71) Applicant: Dimitrios Aslanis, Vrilisia Attikis (GR)

(72) Inventor: Dimitrios Aslanis, Vrilisia Attikis (GR)

(*) Notice: Subject to any disclaimer, the term of this patent is extended or adjusted under 35 U.S.C. 154(b) by 356 days.

(21) Appl. No.: 17/291,531

(22) PCT Filed: Nov. 5, 2019

(86) PCT No.: PCT/GR2019/000076
§ 371 (c)(1),
(2) Date: May 5, 2021

(87) PCT Pub. No.: WO2020/095072
PCT Pub. Date: May 14, 2020

(65) Prior Publication Data
US 2022/0000092 A1 Jan. 6, 2022

(30) Foreign Application Priority Data

Nov. 9, 2018 (GR) .............................. 20180100511

(51) Int. Cl.
*A01M 1/24* (2006.01)
*A01M 1/22* (2006.01)

(52) U.S. Cl.
CPC .............. *A01M 1/24* (2013.01); *A01M 1/223* (2013.01)

(58) Field of Classification Search
CPC ........... A01M 1/22; A01M 1/223; A01M 1/24
USPC ........................................... 43/119, 112, 109
See application file for complete search history.

(56) References Cited

U.S. PATENT DOCUMENTS

| | | | | |
|---|---|---|---|---|
| 524,596 A | * | 8/1894 | Long | A01M 1/24 49/60 |
| 882,631 A | * | 3/1908 | Fuller | 43/119 |
| 1,059,253 A | * | 4/1913 | Wimbish | A01M 1/223 43/119 |
| 1,167,855 A | * | 1/1916 | Stipp | A01M 1/223 D25/48.8 |
| 1,334,099 A | * | 3/1920 | Johnson | A01M 1/106 43/119 |
| 1,338,113 A | * | 4/1920 | Tibbetts | A01M 1/24 43/119 |

(Continued)

FOREIGN PATENT DOCUMENTS

| | | | | |
|---|---|---|---|---|
| AU | 2013263060 B2 | * | 9/2016 | ............ A01M 1/106 |
| CN | 2554323 Y | * | 6/2003 | |

(Continued)

OTHER PUBLICATIONS

Sliney et al., "Ultraviolet safety assessments of insect light traps", Jun. 2, 2016, J Occup Environ Hyg, Link: https://www.ncbi.nlm.nih.gov/pmc/articles/PMC4867860/.

(Continued)

*Primary Examiner* — Darren W Ark
(74) *Attorney, Agent, or Firm* — Maschoff Brennan

(57) ABSTRACT

The invention refers to an insect trap consisting of a housing (1) in which there is a power supply system (2) and an electrical circuit board (3). The insect trap has a multi-layer mesh (4), in which an electric field of e.g. 2500 V is developed, thereby killing the insects. It may also have a lamp (7) to attract insects and a tray (8) at the bottom of the trap to collect the killed insects. The use of a screen (6) under the trap covers the remaining space of the aperture, allowing tenants to pass through.

4 Claims, 13 Drawing Sheets

(56) References Cited

U.S. PATENT DOCUMENTS

| | | | |
|---|---|---|---|
| 1,340,779 A * | 5/1920 | Lee | A01M 1/24 43/119 |
| 1,399,193 A * | 12/1921 | Coe | A01M 1/24 49/60 |
| 1,411,189 A * | 3/1922 | Samuelson | E06B 9/522 43/119 |
| 1,749,717 A * | 3/1930 | Palmos | A01M 1/106 43/119 |
| 1,848,625 A * | 3/1932 | Hager | A01M 1/223 256/10 |
| 1,871,978 A * | 8/1932 | Frost | A01M 1/223 43/112 |
| 1,879,495 A * | 9/1932 | Renwick | A01M 1/223 43/112 |
| 1,882,550 A * | 10/1932 | Frost | A01M 1/223 43/112 |
| 1,910,623 A * | 5/1933 | Mcwilliams | A01M 1/223 43/112 |
| 1,974,549 A | 9/1934 | Spencer et al. | |
| 1,981,951 A * | 11/1934 | Folmer | A01M 1/223 188/196 A |
| 2,001,414 A * | 5/1935 | Folmer | A01M 1/24 43/112 |
| 2,030,310 A * | 2/1936 | Mcwilliams | A01M 1/223 43/112 |
| 2,117,767 A * | 5/1938 | Lindsley | A01M 1/223 43/112 |
| 2,123,127 A * | 7/1938 | Whipple | A01M 1/223 43/112 |
| 2,159,618 A * | 5/1939 | Lindsley | A01M 1/223 43/112 |
| 2,165,560 A * | 7/1939 | Luther | A01M 1/223 43/112 |
| 2,177,846 A * | 10/1939 | Swangren | A01M 1/04 43/112 |
| 2,218,369 A * | 10/1940 | Whipple | A01M 1/223 361/232 |
| 3,077,050 A * | 2/1963 | Makara | A01M 1/223 43/119 |
| 3,997,999 A | 12/1976 | Evans | |
| 4,300,306 A * | 11/1981 | Hudgin | A01M 1/223 256/10 |
| 4,328,636 A | 5/1982 | Johnson | |
| 4,501,088 A | 2/1985 | Schultz et al. | |
| 4,642,936 A | 2/1987 | Jobin et al. | |
| 4,813,174 A | 3/1989 | Cook | |
| 6,341,444 B1 * | 1/2002 | Cina | A01G 13/10 43/119 |
| 6,474,014 B1 * | 11/2002 | Yu | A01M 1/06 43/119 |
| 6,625,922 B1 | 9/2003 | Ernsberger, IV | |
| 6,772,556 B1 | 8/2004 | Liu | |
| 6,874,273 B1 * | 4/2005 | Weisenburg, III | A01M 1/04 43/119 |
| 6,928,768 B1 | 8/2005 | Snow | |
| 7,380,369 B1 * | 6/2008 | Greene | A01M 1/10 43/107 |
| 7,412,797 B1 | 8/2008 | Hiscox | |
| 7,669,362 B2 | 3/2010 | Cwiklinski et al. | |
| 10,151,141 B2 * | 12/2018 | Hoffman | A01M 1/24 |
| 2002/0104255 A1 | 8/2002 | Hobson | |
| 2006/0236592 A1 | 10/2006 | Hall | |
| 2006/0283075 A1 | 12/2006 | Feldhege et al. | |
| 2008/0163541 A1 | 7/2008 | Harris | |
| 2009/0038207 A1 * | 2/2009 | Lin | A01M 1/04 43/112 |
| 2009/0223115 A1 | 9/2009 | Lang et al. | |
| 2012/0186137 A1 | 7/2012 | Schneidmiller et al. | |
| 2016/0183512 A1 * | 6/2016 | Chan | A01M 1/24 43/98 |
| 2017/0202200 A1 | 7/2017 | Hortel et al. | |
| 2018/0274294 A1 * | 9/2018 | Hoffman | A01M 1/24 |
| 2019/0104718 A1 * | 4/2019 | Cano | A01M 1/223 |
| 2020/0047996 A1 * | 2/2020 | Miller | B65F 1/1646 |
| 2020/0053998 A1 * | 2/2020 | Plain | A01M 1/106 |

FOREIGN PATENT DOCUMENTS

| | | | |
|---|---|---|---|
| CN | 201007178 Y * | 1/2008 | |
| CN | 101123877 A | 2/2008 | |
| CN | 201723134 U * | 1/2011 | A01M 1/22 |
| CN | 102913116 A * | 2/2013 | |
| CN | 103391713 A | 11/2013 | |
| CN | 103548797 A * | 2/2014 | A01M 1/04 |
| CN | 204386438 U * | 6/2015 | |
| CN | 105156007 A * | 12/2015 | A01M 1/223 |
| CN | 204837665 U * | 12/2015 | |
| CN | 105735851 A * | 7/2016 | A01M 1/00 |
| CN | 206409155 U * | 8/2017 | |
| CN | 107654181 A * | 2/2018 | A01M 1/223 |
| CN | 207160940 U * | 3/2018 | |
| CN | 108331516 A * | 7/2018 | A01M 1/223 |
| CN | 208310666 U * | 1/2019 | |
| CN | 109723364 A * | 5/2019 | |
| CN | 109864050 A * | 6/2019 | |
| CN | 209261450 U * | 8/2019 | |
| CN | 210422388 U * | 4/2020 | |
| CN | 213344050 U * | 6/2021 | |
| CN | 214997280 U * | 12/2021 | |
| CN | 114320135 A * | 4/2022 | |
| CN | 217308760 U * | 8/2022 | |
| EP | 0758194 B1 | 10/2002 | |
| GB | 2 171 882 A | 9/1986 | |
| JP | 2003321307 A | 11/2003 | |
| JP | 2007195404 A * | 8/2007 | |
| JP | 2008167668 A * | 7/2008 | |
| JP | 4129673 B2 | 8/2008 | |
| JP | 4166358 B2 | 10/2008 | |
| JP | 2010279270 A * | 12/2010 | |
| JP | 5252449 B2 * | 7/2013 | |
| JP | 5876062 B2 | 3/2016 | |
| JP | 5943377 B2 | 7/2016 | |
| JP | 2019126302 A * | 8/2019 | |
| JP | 7090276 B2 * | 6/2022 | |
| KR | 940006721 B1 * | 7/1994 | |
| KR | 20100104306 A * | 9/2010 | |
| KR | 100984632 B1 | 10/2010 | |
| KR | 101033842 B1 | 5/2011 | |
| KR | 20150008020 A * | 1/2015 | |
| KR | 102261192 B1 * | 6/2021 | |
| KR | 20210108113 A * | 9/2021 | |
| WO | WO-0130138 A2 * | 5/2001 | A01G 13/10 |
| WO | WO-2013173300 A1 * | 11/2013 | A01M 1/106 |
| WO | WO-2015097722 A1 * | 7/2015 | A01M 1/023 |

OTHER PUBLICATIONS

Russo et al., "The Composite Insect Trap: An Innovative Combination Trap for Biologically Diverse Sampling", Jun. 16, 2011, Plos One, Link: https://journals.plos.org/plosone/article?id=10.1371/journal.pone.0021079.

Paul, Rusnak, "New Insect Trapping Device", Feb. 5, 2013, Growing Produce, Link: https://www.growingproduce.com/fruits/new-insect-trapping-device/.

* cited by examiner

TRAP FOR INSECTS

FIELD OF ART

The invention relates to the field of insect trapping and more specifically to fixed means for trapping or killing insects and even more specifically to traps with devices for attracting insects.

BACKGROUND OF THE INVENTION

The trap for insects disclosed in the present invention has not been disclosed in its particular form in the prior art.

Insects are the most widespread land animals and are estimated to be present on earth in at least one million recorded species. Although there are few insects living in the sea, they are common in brackish waters and beaches, as are abundant in freshwater. They usually range in length from 0.2 mm to 30 cm, but the majority are between one and twenty millimetres long. Some insect species are considered by humans to be pests, such as cockroaches, mosquitoes and flies, so their populations are usually controlled by insecticides and other techniques. Particularly in the case of crops, some types of insects can be particularly destructive to crops, while other species, under certain circumstances, are dangerous to human health as they can carry pathogenic microorganisms, such as mosquitoes, which are known as carriers of malaria. In addition, many diseases such as zika and dengue fever are caused by mosquitoes, for which there are no antidotes and cause 1.000.000 deaths annually.

The most important problem to date against insects and especially mosquitoes, considered being the most annoying and dangerous insect, is that frequent insecticide processes have to be carried out using commonly used chemicals, which are detrimental to citizens' health, as their long-term side effects have not been studied, but they also have a significant impact on the environment. In addition, daily use of anti-mosquito substances is often the only solution in terms of protection, but the inhalation effects of these substances have not been thoroughly studied.

Solutions that have been proposed so far only address the problem occasionally, since the presence of screens for example does not guarantee the continued protection of an area. Often tenants forget to lower the screens, and sometimes their maintenance is incomplete, resulting in holes that allow insects to pass through. In addition, the presence of a screen does not ensure the elimination of mosquitoes that continue to multiply and so their population continues to increase. Another known solution involves the use of portable ultrasound devices, their effectiveness being doubtful.

It is thus an object of the present invention to address the aforementioned disadvantages and deficiencies of the prior art by proposing an insect trap.

It is a further object of the present invention to provide an insect trap, which is applied to any opening, door or window, effectively protecting the space in question.

It is a further object of the present invention to provide an insect trap, which operates by creating an electric field that kills insects.

It is a further object of the invention to provide an insect trap, which may have a tray for collecting dead insects, for easy cleaning.

A further object of the invention is to provide a trap carrying a screen for insects, which may allow human passage.

It is another object of the invention to provide an insect trap, which can be fully powered by renewable energy sources, thereby being fully autonomous and ecological.

It is another object of the invention to provide an insect trap, which may carry a lamp, to attract insects.

A further object of the present invention is to provide an insect trap, which can operate in parallel, independently or in combination, with other similar insect traps, forming arrays.

Another advantage of the invention is that it may be mounted on hatches, such as those used by boats and caravans.

These and other objects, features and advantages of the invention will become apparent in the following detailed description.

BRIEF DESCRIPTION OF THE DRAWINGS

The invention will be apparent to those skilled in the art with reference to the accompanying drawings, given in an exemplary, non-limiting manner.

DETAILED DESCRIPTION OF A PREFERRED EMBODIMENT

Referring now to the accompanying drawings, we will describe indicative applications of the trap for insects in order to show both its mode of operation and its beneficial features. The insect trap consists of a housing (1), FIG. 1, in which the power supply system (2), FIG. 1, and the circuit board (3) are mounted. The housing (1) is partially or completely made of suitable plastic, such as, for example, polyvinyl chloride, of metal or a combination thereof. The board (3) is powered by the power supply system (2) and generates the appropriate electric field. The field is a low current field of 2500V or even higher. The electric field is developed on a grid (4), made of suitable conductive materials. The integral grid (4) consists of three layers, where both the outer layer and the inner one have larger diametre holes, while the middle layer where the electric field is created has appropriate diametre holes to prevent insect passage.

Figure 2:
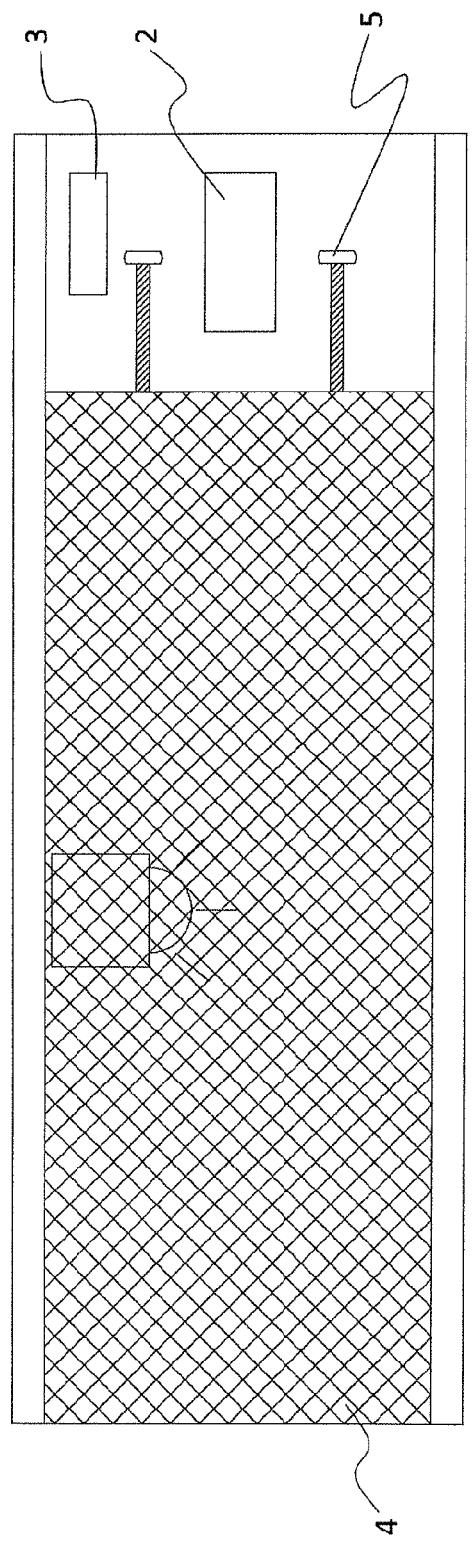
FIG. 2 shows in a perspective view, another exemplary embodiment of the trap for insects, according to the invention.

In an illustrative variant, the insect trap is fastened by using clamps (5), FIG. 2, which extend, either on one side of the housing (1), or on both, to fasten the trap on the door or window frame or in general on the opening to be mounted. At the bottom of the insect trap a collapsible screen (6) of any form is attached, which essentially prevents insect passage, but also allows users to enter and exit as desirable. In an alternative embodiment instead of a screen (6) any suitable curtain may be fitted, such as cabin curtains, air curtains or opening doors. Given that insects and especially mosquitoes are always trying to find the proper opening to enter a room, it is desirable that the holes of the screen (6) are smaller than the corresponding holes of the outer layers of the grid (4) so that they should be guided to it to pass through. The insect trap can be mounted even on existing screens (6).

Figure 5:
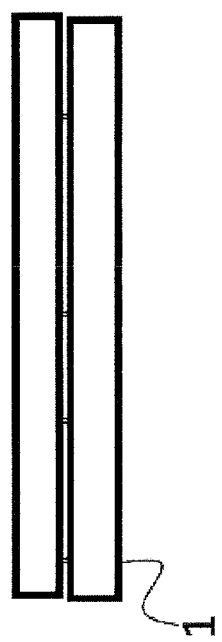
FIG. 5 shows an illustrative construction variant of the invention, wherein the insect trap consists of two superimposed segments
Figure 6:
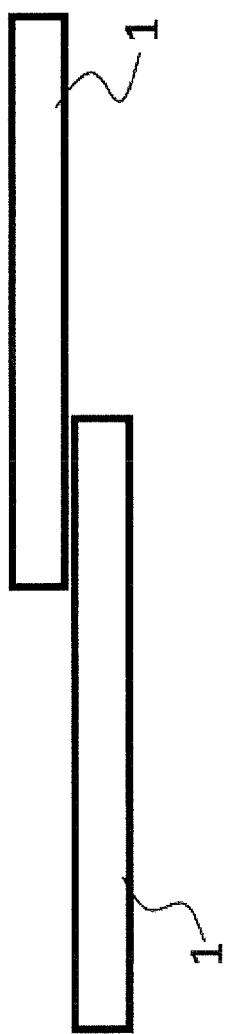
FIG. 6 shows the superimposed segments of the trap deployed.

The insect trap can be mounted in the openings in other ways, too. It is therefore possible to create an insect trap of shorter length and consisting of two superimposed segments, FIG. 5. In this way it will be placed and supported in the frame only on one side, and when the user uses it he will deploy its superimposed segments, FIG. 6. In such a case the collapsible screen (6) will be placed in a second step and after the trap has been deployed.

Figure 7:
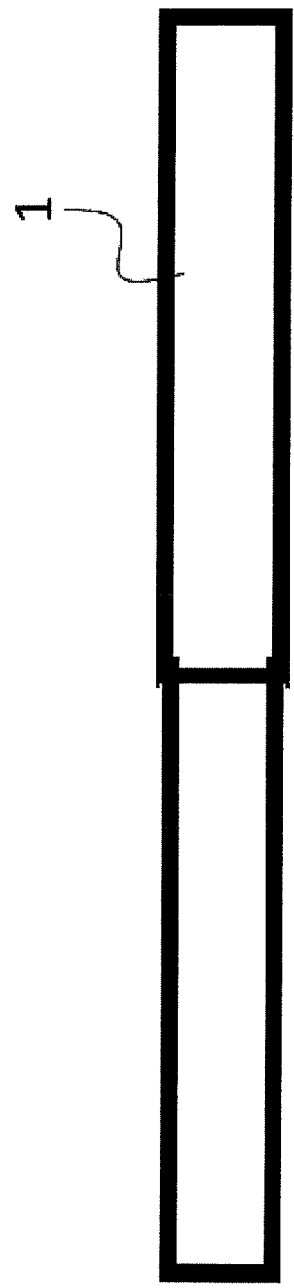
FIG. 7 shows a variant of the invention, wherein the trap consists of two sliding segments, which slide one into the other when not in use.

In another alternative variant of the invention, the insect trap may be of a sliding type, with one part of it inserting into the other, thereby making it smaller in size when closed. When the user wishes to use it, the user will slide it open, FIG. 7, to fully expand and cover the opening, and then place the screen (6) below it. This embodiment will be able to accommodate openings of different dimensions, since the deployment of the trap will be done to the extent necessary to cover the entire opening of the frame.

Figure 8:
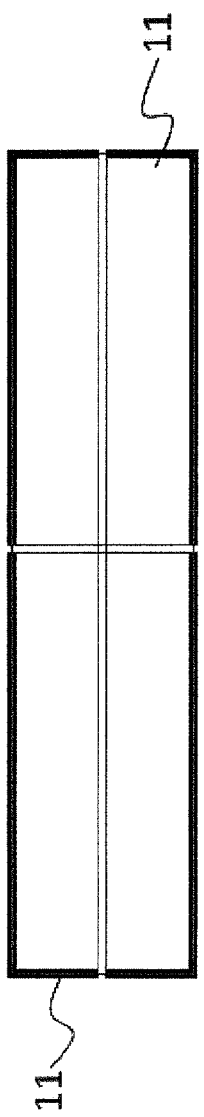
FIG. 8 shows a further construction variant of the invention, wherein the insect trap consists of four sections, which deploy both parallel and perpendicular to the ground.

In yet another alternative embodiment of the invention, the trap may be divided into four portions, FIG. 8, so that it collapses both upwards and to one side so that when closed it occupies one quarter of the total area. To do this, there are essentially four frames (11), each moving on drivers at the rear part thereof. Thus, the two frames (11) first deploy perpendicular to the ground, and then two more frames deploy in a superimposing manner to the first ones and parallel to the ground.

Additionally, it is recommended to place a lamp (7) above or near the trap for insects to attract them. The lamp supply, preferably of low power consumption, can be made by the trap power supply, but can also be supplied separately. It goes without saying that, respectively, it may operate simultaneously with the trap or if it is desirable to operate independently of it.

Figure 3:
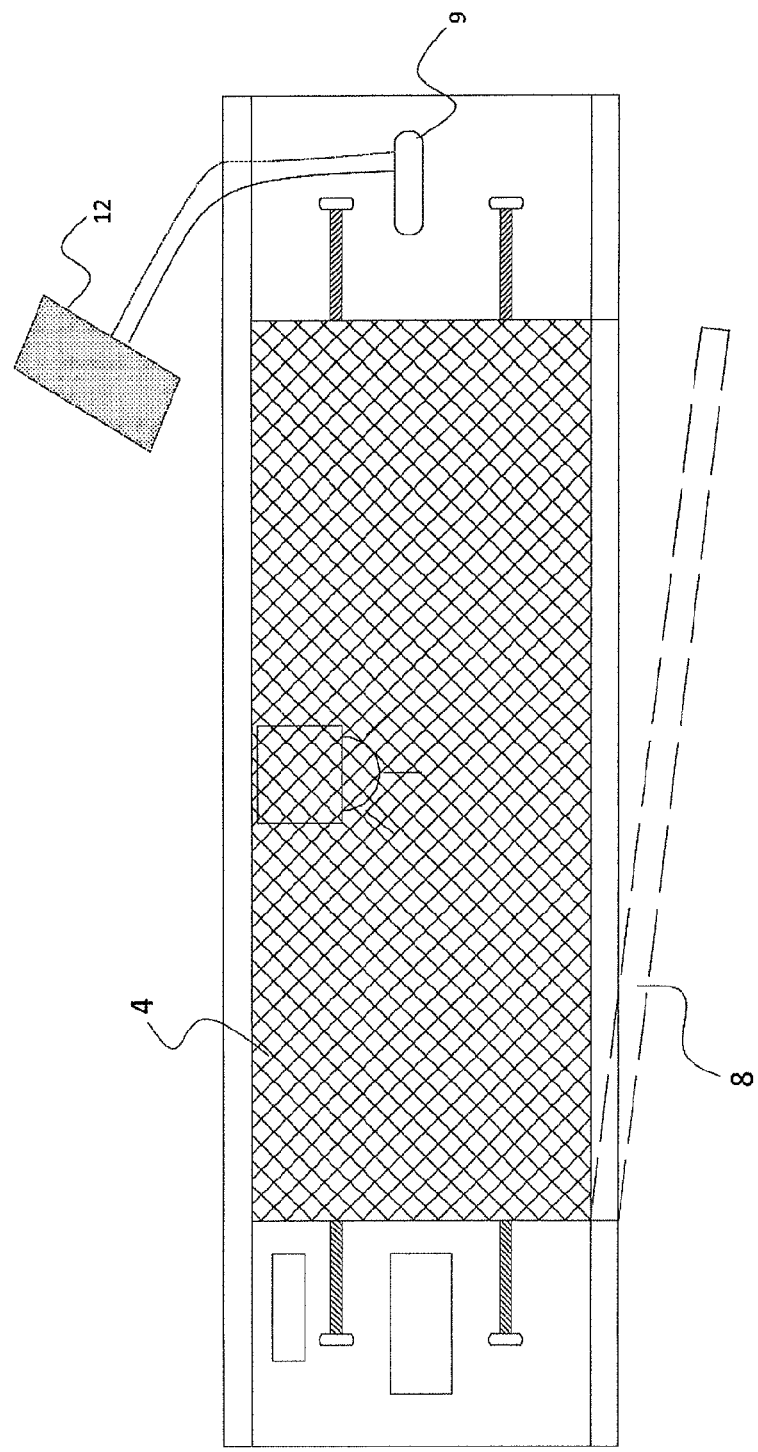
FIG. 3 shows in a perspective view an alternative embodiment of the invention, with the relevant insect collection tray.
Figure 4:
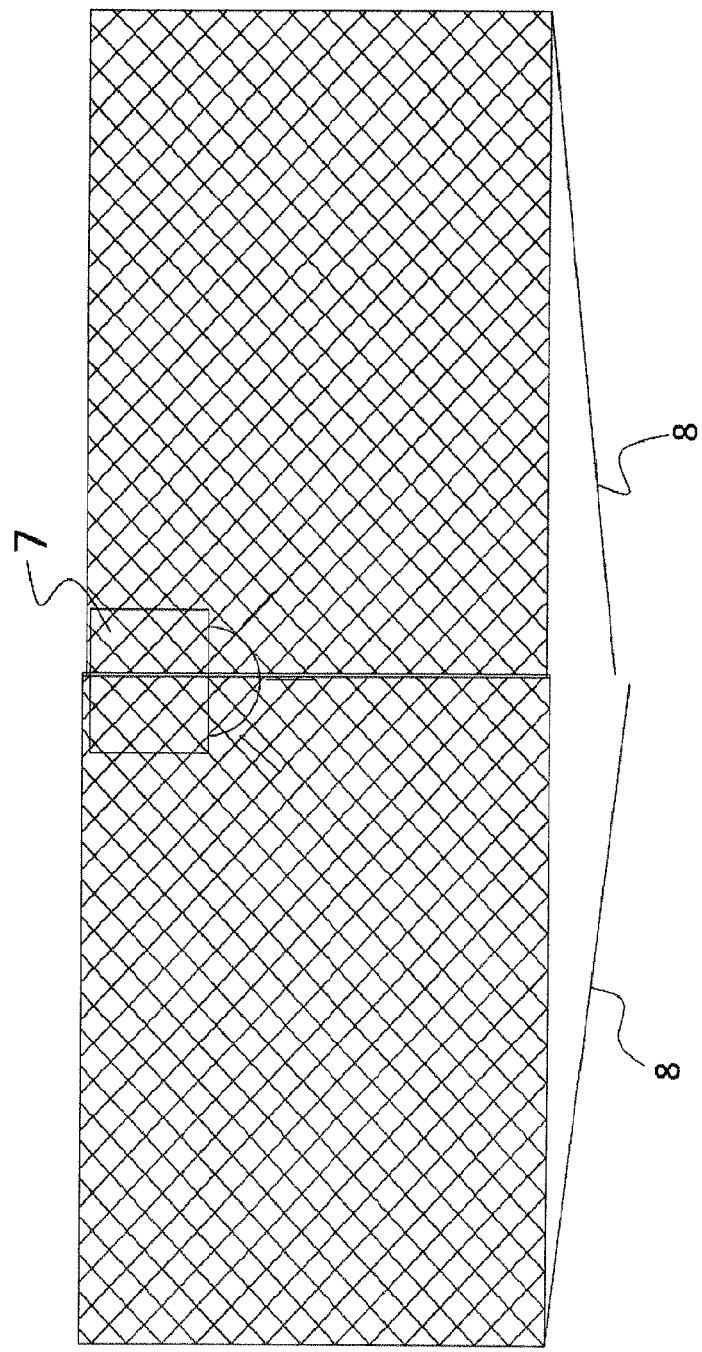
FIG. 4 shows an illustrative embodiment of the insect trap, with a tray consisting of two parts, which open independently of each other.

In a further alternative embodiment and additionally to the above, it is possible to place a tray (8), FIG. 3 at the bottom of the insect trap. This tray (8) contributes to the collection of insects killed by the field developed on the grid (4). Thus an insect that is killed in the field falls into the particular tray (8) and thus the user may collect all the insects at regular intervals and clean the tray (8). In an embodiment the tray (8) may be fully detachable, while in an alternative embodiment it may be simply opened on one side and allow the insects to be collected or absorbed by means of a broom. The tray (8) may further alternatively consist of two parts, of equal or different length, which are opened separately, FIG. 4.

In a further alternative embodiment of the invention, the inventive insect trap may have a field intensity controller through which the field intensity is varied. This ensures that the trap will work as desirable, while not causing the usual, annoying noise from killing the insects that hit the grid (4).

In another alternative embodiment, a battery (9) may be inserted inside the housing (1), ensuring that the trap operates even in the event of a power failure. This battery (9) will be able to operate in parallel with power from renewable sources, such as solar, using solar panels (12), as well as wind energy. This allows that the power supply is secured by the battery (9) when it is not possible to use renewables, the renewables charging the battery (9) when the trap is powered by them.

Figure 10:
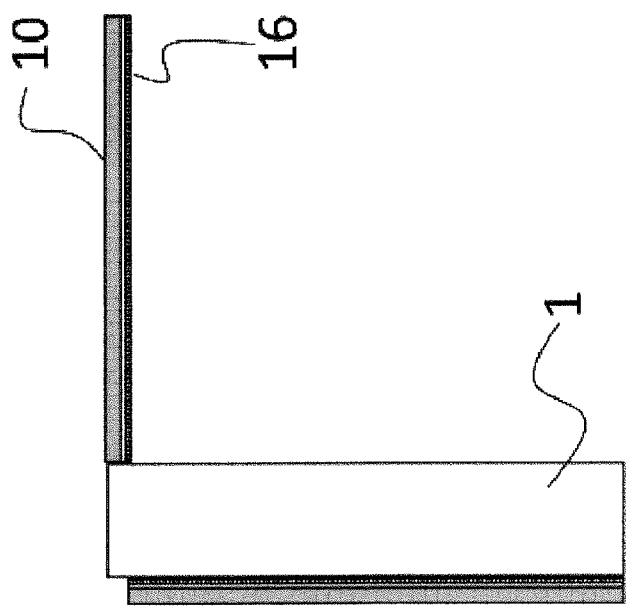
FIG. 10 shows a side view of the insect trap, which, for example, is embedded in openings, with its protective cover when not in operation.

In a further alternative embodiment of the invention the trap may be placed on exterior wall apertures by embedding it. In such a case, the trap operates without an additional screen (6), but has additional covers (10) on each side, FIG. 10, with internal insulation (16), that may be opened and which the user opens when the trap is to be used. This attracts mosquitoes that are killed by the electric field of the grid (4). This alternative could be used in areas such as camps and campings that are generally guarded. When the trap is not in use, the covers (10) remain closed and their insulation (16) contributes to the overall insulation of the building.

In yet another alternative embodiment of the invention, the insect trap may have means for remotely activating and deactivating it using a remote control. Accordingly, in ways already known, it may be switched on and off, resulting in it not being constantly under voltage, and alternatively capable of communicating with state-of-the-art devices, such as phones and tablets, and activating by communicating with known technologies, such as WiFi and Bluetooth technology.

Figure 9:
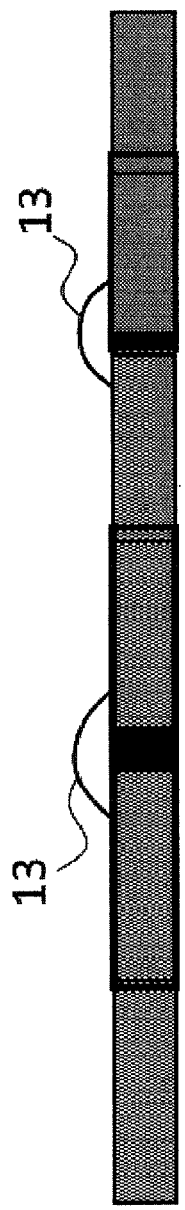
FIG. 9 shows an array of traps for insects, which are arranged in succession to cover larger openings.

In another variant of the invention, an array of multiple devices may be created to cover large openings, such as outdoor spaces or patios, which cannot be covered by one device. The trap array, FIG. 9, can be operated with a power supply system (2) and an electrical circuit board (3). The traps can be connected together using cables (13) and male and female plugs. In an alternative embodiment there may be only one power supply system (2), but each trap shall have its own circuit board (3).

Figure 11:
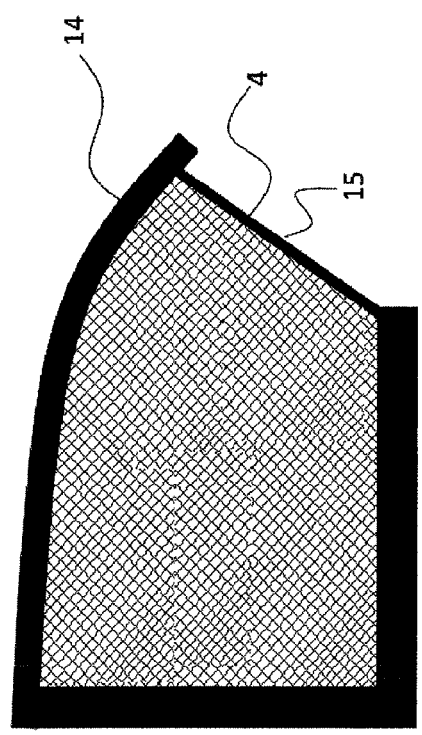
FIG. 11 shows a side view of the trap with a grid and cover which protects the electrical and electronic parts of the device.

In another variant the insect trap may have a grid (4) externally on its side to further trap the insects. In fact, in cases where it is mounted in openings that have no overhead protection, it may have a cover (14), FIG. 11, which is supported by one or more brackets (15), which protect it from rain and generally weathering conditions. The cover (14) can be oval or any other suitable shape, enhancing the aesthetics of the device.

Figure 12:
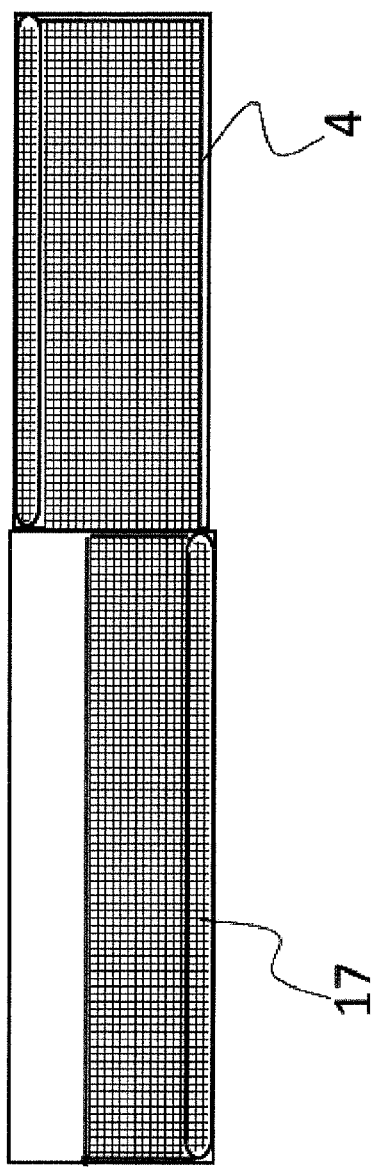
FIG. 12 shows a perspective view of an alternative embodiment of the invention, wherein the grid is expanded from a roll
Figure 13:
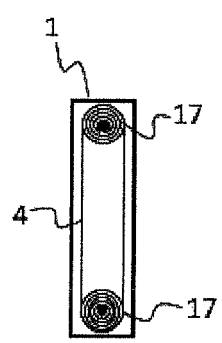
FIG. 13 shows a side view of said alternative.

In yet another variant the insect trap may be deployed in a sliding manner, FIG. 12, but the grid (4) is in the form of rolls (17), wrapped within the trap segments. The two grid rolls (17) deploy independently, one from bottom to top and the other from top to bottom, FIG. 13. The result of the above process is to create again a grid (4) in which the electric field is created.

Figure 1:
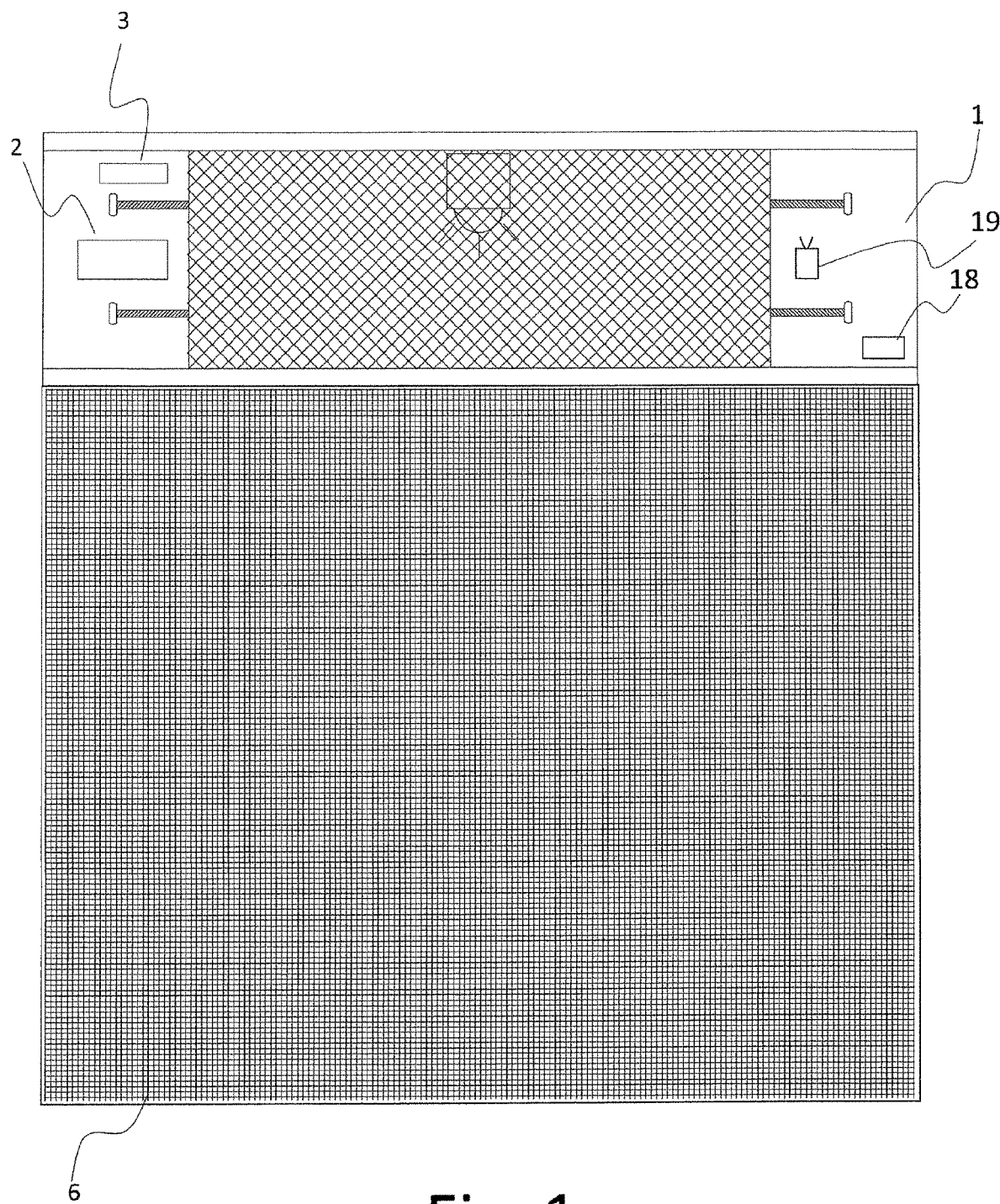
FIG. 1 shows in a perspective view, an exemplary embodiment of an insect trap, applied in an opening, together with a related protection screen.

In a further embodiment of the device, the insect trap may have a processor (18), FIG. 1, and a transceiver (19), working with all known technologies, such as Bluetooth and Wifi, to communicate with advanced devices and transmit data on the number of insects killed by the trap grid (4). The measurement may be made by the change in the electric field of the grid (4), upon the impact of an insect. In this way a map and a picture of the insects and especially mosquitoes that are killed in areas where such traps are installed can be created electronically.

It should be noted at this point that the invention was described with reference to illustrative examples of application, but not limited to. It is assumed that any change or modification in the shape, dimensions, morphology, materials used and components of construction and assembly, as long as they are not a new inventive step and do not contribute to the technical development of the already known, are considered embodied in the aims and intentions of the present invention.

The invention claimed is:

1. An insect trap, comprising:
    a housing that comprises a power supply, an electrical circuit board, and an integral three-layer grid;
    the three-layer grid comprising an inner layer, a middle layer and an outer layer attached to the housing;
    wherein an electric is developed in the middle layer of the grid which kills insects that come into contact with it; and
    wherein both the outer layer and the inner layer of the grid have larger diameter holes allowing insect passage and the middle layer of the grid has appropriate diameter holes to prevent insect passage;
    wherein the housing is mounted on a first portion of a frame with clamps;
    wherein a second portion of the frame different from the first portion of the frame is covered by a collapsible screen,
    wherein a top side of the collapsible screen is fixed to a bottom of the housing, and remaining sides of the collapsible screen are free, allowing entry or exit of a user through the frame while preventing the passage of the insects through the frame;
    wherein the screen has holes with a smaller diameter than the holes in both the outer layer and the inner layer of the grid, such that the screen guides the insects toward the trap; and the insect trap is adjustable to external and internal frames of a building.

2. The insect trap according to claim 1, further comprising an opening tray under the grid, in which the dead insects are collected.

3. The insect trap according to claim 1, further comprising a lamp powered by the power supply system to attract the insects.

4. The insect trap according to claim 1, further comprising a cover, supported by at least one support, which protects the trap from weather conditions.

\* \* \* \* \*